United States Patent
Koyano et al.

[11] Patent Number: 6,055,081
[45] Date of Patent: *Apr. 25, 2000

[54] CHROMATIC DISPERSION COMPENSATOR AND CHROMATIC DISPERSION COMPENSATING OPTICAL COMMUNICATION SYSTEM

[75] Inventors: Yasushi Koyano; Masayuki Shigematsu, both of Yokohama, Japan

[73] Assignee: Sumitomo Electric Industries, Ltd., Osaka, Japan

[*] Notice: This patent is subject to a terminal disclaimer.

[21] Appl. No.: 08/782,756

[22] Filed: Jan. 10, 1997

Related U.S. Application Data

[63] Continuation-in-part of application No. 08/535,902, Sep. 28, 1995, Pat. No. 5,701,188.

[30] Foreign Application Priority Data

Mar. 15, 1995 [JP] Japan ........................... 7-55286
Jan. 10, 1996 [JP] Japan ........................... 8-002294

[51] Int. Cl.[7] ............................................. H04B 10/18
[52] U.S. Cl. ........................... 359/161; 359/130; 359/173
[58] Field of Search ........................... 359/127, 130, 359/134, 161, 173; 385/15, 74

[56] References Cited

U.S. PATENT DOCUMENTS

| | | |
|---|---|---|
| 4,261,639 | 4/1981 | Kogelnik . |
| 4,953,939 | 9/1990 | Epworth ................................. 385/15 |
| 5,243,609 | 9/1993 | Huber .................................... 372/15 |
| 5,404,413 | 4/1995 | Delavaux et al. ..................... 385/15 |
| 5,410,624 | 4/1995 | Morkel .................................. 385/24 |
| 5,557,468 | 9/1996 | Ip ......................................... 357/615 |
| 5,701,188 | 12/1997 | Shigematsu ......................... 359/161 |
| 5,715,265 | 2/1998 | Epworth ............................... 372/28 |

OTHER PUBLICATIONS

Garthe D. et al., "Practical Dispersion Equaliser Based in Fibre Gratings With A Bitrate Length Product of 1.6 TB/S.KM", Proceedings of the European Conference on Optical Communication, vol. 4, 1994, pp. 11–14.

Onishi, M. et al., "Dispersion Compensating Fibre With a High Figure of Merit of 250PS/NM/DB", Electronics Letters, vol. 30, No. 2, Jan. 20, 1994, pp. 161–163.

Eggelton B.J. et al., "Recompression of Pulses Broadened by Transmission Through 10 KM of ...", IEEE Photonics Technology Letters, vol. 7, No. 5, May 1, 1995, pp. 494–496.

The Realization of Broad–Band Dispersion compensation using the Multicladding Waveguide Structure.A.V. Belov et al. pp. 349–352.

Aperiodic In–Fiber Bragg Gratings for Optical Fiber Dispersion Compensation,K.O. Hill et al Proceding of the 1994 Optical fiber pp. 335–337.

High Performance Dispersion–Compensating Fiber and its Application to Upgrading of $1.31\mu m$ Optimized System. M. Onishi et al. pp. 357–360.

*Primary Examiner*—Leslie Pascal
*Attorney, Agent, or Firm*—Pillsbury Madison & Sutro LLP

[57] ABSTRACT

In a chromatic dispersion compensator, an optical signal directing unit such as an optical circulator or a directional coupler having a first, second, third and fourth ports. The optical signal directing unit directs an optical signal inputted from one of the ports to another port of the ports. A reflection-type compensator including a dispersion compensating fiber, a reflecting portion and changing unit for changing a polarization direction of a reciprocating signal light, in which the dispersion compensating fiber is connected to the reflecting portion via the changing unit. An input transmission path which is connected to the first port; and an output transmission path which is connected to the fourth port so that the signal light is outputted from the fourth port. The reflection-type compensating unit is connected to one of the second and third ports, and the chirped grating is connected to the other port.

24 Claims, 4 Drawing Sheets

$\lambda_1 > \lambda_2 > \lambda_3 > \lambda_4$

CHROMATIC DISPERSION COMPENSATOR AND CHROMATIC DISPERSION COMPENSATING OPTICAL COMMUNICATION SYSTEM This application is a continuation-in-part application of U.S. patent application Ser. No. 08/535,902 filed on Sep. 28, 1995.

BACKGROUND OF THE INVENTION

1. Field of the Invention

The present invention relates to a chromatic dispersion compensator for compensating chromatic dispersion in a transmission path of an optical fiber communication system and relates to a chromatic dispersion compensating optical communication system using such a chromatic dispersion compensator.

2. Description of the Related Art

If there arises chromatic dispersion in an optical fiber used as a transmission path in a optical digital transmission system, lowering of transmission quality is brought about. This is because chromatic dispersion and chirping produced by direct modulation of a semiconductor laser as a transmitter are coupled to generate waveform distortion. The degradation of transmission quality caused by waveform distortion becomes more remarkable as the bit rate increases. For example, in the case of 10 Gbps, it is necessary that the waveform distortion (spreading) is controlled to be sufficiently smaller than the time width of one slot, that is, about 10 ps which is one-tenth as much as 1/10 Gbps=100 ps.

As adding to the recent improvement of the bit rate, the distance of repeaterless transmission has been elongated with the advent of an Er-doped optical fiber amplifier having an amplifying function in a 1.55 µm band in which a silica based optical fiber exhibits the lowest transmission loss, the necessity of delicately controlling the value of chromatic dispersion has arisen even in the case where a dispersion shifted fiber (DSF) having zero dispersion wavelength in the 1.55 µm band is used as a transmission path. For example, there is used a chromatic dispersion compensating technique in which accumulated chromatic dispersion is cancelled by a fiber having chromatic dispersion with opposite sign at each relay point.

Further, in the case where a 1.55 µm-band optical fiber amplifier is used in the transmission path of a 1.3 µm-band single mode fiber (1.3 SMF) having been already installed or in the transmission path of a very low loss pure silica core fiber, large positive chromatic dispersion of these fibers in the 1.55 µm band becomes a problem. Therefore, a dispersion compensating fiber having large negative chromatic dispersion in the 1.55 µm wavelength band has been developed. Such a dispersion compensating fiber is known by ELECTRONICS LETTERS, Vol. 30, No. 2, (Jan. 20, 1994), pp. 161–162.

Considering further that the capacity will be increased more and more in the future, a wavelength division multiplexing transmission method (WDM) promises a bright future. In this case, it is necessary that chromatic dispersion takes zero in a wavelength range of an optical signal used. However, chromatic dispersion itself has dependency on wavelength. In the case of a matched cladding type fiber, the slope of dispersion, that is, the dispersion slope, is generally positive. Accordingly, it is difficult to set the chromatic dispersion zero in a wide wavelength range.

In order to solve this problem, a chromatic dispersion flattened fiber in which chromatic dispersion is approximately zero in a wide wavelength range is used as a transmission path. Further, a dispersion compensating fiber having a negative dispersion slope has been developed, for example, as known by European Conference on Optical Communication '94, pp. 681–684. However, it is difficult to produce these fibers because these fibers are complex in the form of refractive index distribution so as to be not controllable.

On the other hand, a chirped grating has been proposed as means for compensating chromatic dispersion, for example, as known by Optical Fiber Communication Conference '94, postdeadline paper-2, PD2-1 to PD2-4. First, a fiber grating will be described. The fact that the refractive index of a core portion of a Ge-doped core optical fiber is increased when ultraviolet rays of wavelength near 240 nm are radiated onto the Ge-doped core optical fiber is known by Inoue et al, "Generation of Fiber Grating and Application thereof", SHINGAKU-GIHOU, OPE94-5, Institute of Electronics, Information and Communication Engineers of Japan. A periodic refractive index change is formed in the fiber core by using the ultraviolet rays induced refractive index change, by which a diffraction grating can be obtained so that a specific wavelength can be reflected by the diffraction grating.

FIG. 10 is an explanatory view for explaining the chirped grating. In the drawing, the reference numeral 61 designates an optical signal of wavelength $\lambda_1$; 62, an optical signal of wavelength $\lambda_2$; 63, an optical signal of wavelength $\lambda_3$; 64, an optical signal of wavelength $\lambda_4$; and 65, an optical fiber. The relations between the magnitudes of the wavelengths are $\lambda_1 > \lambda_2 > \lambda_3 > \lambda_4$. The chirped grating operates so that the wavelength reflected by the aforementioned diffraction grating is shifted in the direction of the length of the fiber, that is, chirped. Chromatic dispersion can be compensated by the chirped grating. The optical fiber 65 has the core portion in which the refractive index is changed by the ultraviolet rays induced refractive index change. Respective optical signals 61 to 64 of wavelengths $\lambda_1$ to $\lambda_4$ incident to the optical fiber from the left in the drawing are reflected at intermediate portions so as to return to the incident side.

The refractive index change, that is, the period of the grating is designed so as to be gradually reduced from the incident side toward the right so that an optical signal of a longer wavelength is reflected at a position nearer the incident side. Further, by writing the grating so that the percentage of the change of the period of the grating is reduced as the wavelength becomes longer, the dispersion slope can be selected to be negative. Incidentally, because chromatic dispersion is a slope of propagation delay time with respect to wavelength, and the dispersion slope is a slope of the chromatic dispersion, the fact that the dispersion slope is negative means the fact that the dependency of propagation delay time on wavelength is convex upwards.

FIG. 11 is an explanatory view for explaining a WDM transmission method. In the drawing, the reference numeral 71 designates an optical signal transmitter for transmitting an optical signal of wavelength $\lambda_1$; 72, an optical signal transmitter for transmitting an optical signal of wavelength $\lambda_2$; 73, an optical signal transmitter for transmitting an optical signal of wavelength $\lambda_3$; 74, an optical signal transmitter for transmitting an optical signal of wavelength $\lambda_4$; 75, a transmission path; 76, amplifiers; 77, a transmission path; 78, a transmission path; 79, an optical receiver for receiving an optical signal of wavelength $\lambda_1$; 80, an optical receiver for receiving an optical signal of wavelength $\lambda_2$; 81, an optical receiver for receiving an optical signal of wavelength $\lambda_3$; and 82, an optical receiver for receiving an optical signal of wavelength $\lambda_4$. Now, it is assumed that amplified WDM transmission is of four signal wavelengths, by way of example. In the transmitter side, the optical signal transmitters 71 to 74 of wavelengths $\lambda_1$, $\lambda_2$, $\lambda_3$ and $\lambda_4$ are connected to one transmission-side transmission path 75 by a multiplexer not shown. The transmission path 75 is connected to the final one amplifier 76 and the receiver side transmission path 78 through one pair of the relay amplifier 76 and the transmission path 77 or a plurality of pairs of the relay amplifiers 76 and the relay transmission paths 77. The transmission path 78 is connected to the optical receivers 79 to 82 of wavelengths $\lambda_1$, $\lambda_2$, $\lambda_3$ and $\lambda_4$ by a demultiplexer not shown.

Description will be made specifically by using numerical values. The span of the transmission path 77 is about 80 km. In the case where the transmission path 77 is comprised of a 1.3 μm single mode fiber, chromatic dispersion in wavelength of 1550 nm is 17 ps/nm/km, so that the quantity of compensated chromatic dispersion of the overall relay distance is 1360 ps/nm. Even if the amplification wavelength range of the optical fiber amplifier is estimated to be 1550±10 nm, that is, the width of the amplification wavelength range is estimated to be 20 nm, the delay time difference of (1360×20=27200 ps=)27.2 ns is required between the optical signal of the longest wavelength and the optical signal of the shortest wavelength in the amplification wavelength range. Consequently, the length of the optical fiber 65 giving the chirped grating shown in FIG. 10 reaches 2.7 m unpractically.

Incidentally, the delay time difference means the propagation time difference between the signal of the shortest wavelength and the signal of the longest wavelength in the wavelength range of the optical signal as a subject. To set the delay time difference to be A[ps], the grating length L[mm] is selected to be $L \approx 3 \times 10^{11}/1.5 \times A \times 10^{-12} \times (\frac{1}{2}) = A \times 10^{-1}$[mm]. Here, $3 \times 10^{11}$[mm] is the velocity of light in vacuum, 1.5 is the refractive index of glass, and ($\frac{1}{2}$) is a coefficient obtained by taking into account the round trip of the optical signal.

Accordingly, a method in which gratings of narrow wavelength widths near the respective optical signal wavelengths $\lambda_1$ to $\lambda_4$ are produced and the gratings thus produced are arranged is known by the aforementioned Optical Fiber Communication Conference '94, postdeadline paper-2, PD2-1 to PD2-4. In this method, however, there arises a problem that optical signal wavelengths $\lambda_1$ to $\lambda_4$ in respective systems have to be known in advance, etc.

SUMMARY OF THE INVENTION

It is an object of the present invention is to provide a chromatic dispersion compensator for compensating the chromatic dispersion of a transmission path in an optical communication system and to provide a chromatic dispersion compensating optical communication system using such a chromatic dispersion compensator.

A chromatic dispersion compensator according to the present invention is comprised of: an optical signal directing unit having first, second, third and fourth ports, for directing an optical signal inputted from one of the ports to another port of the ports; a reflection-type compensating unit including a dispersion compensating fiber, a reflecting portion and a changing unit for changing a polarization direction of a reciprocating signal light, in which the dispersion compensating fiber is connected to the reflecting portion via the changing unit; an input transmission path which is connected to the first port; an output transmission path which is connected to the fourth port so that the signal light is outputted from the fourth port; wherein the reflection-type compensating unit is connected to one of the second and third ports, and the chirped grating is connected to the other port.

In addition, the chromatic dispersion compensating optical communication system of the present invention includes a transmission path and the above described chromatic dispersion compensator which is connected to an intermediate or end portion of said transmission path.

According to the chromatic dispersion compensator of the present invention, chromatic dispersion which cannot be compensated only by the dispersion compensating fiber is compensated by the chirped grating, so that not only chromatic dispersion of a transmission path can be compensated in a wide wavelength range but also the grating length can be reduced. Further, by using the optical circulator, the loss of insertion can be reduced. Alternatively, by using the directional coupler, the length of the grating can be reduced.

According to the chromatic dispersion compensating optical communication system of the present invention, the chromatic dispersion of the transmission path of the 1.3 μm-band or the fiber having the zero dispersion wavelength in 1.55 μm-band can be compensated.

BRIEF DESCRIPTION OF THE DRAWINGS

In the accompanying drawings.

PREFERRED EMBODIMENTS OF THE INVENTION

The preferred embodiments of the present invention will be described with reference to the accompanying drawings as follows.

Figure 1A:
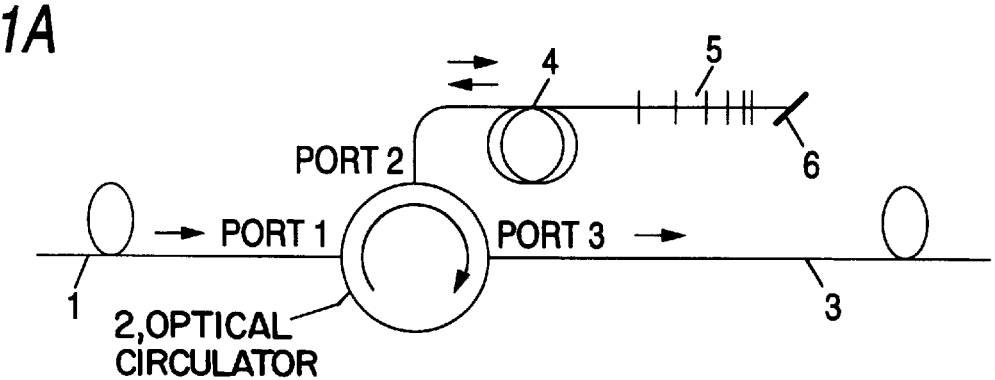
FIG. 1A is an explanatory view for explaining a first embodiment of the present invention showing a case where an optical circulator is used.
Figure 1B:
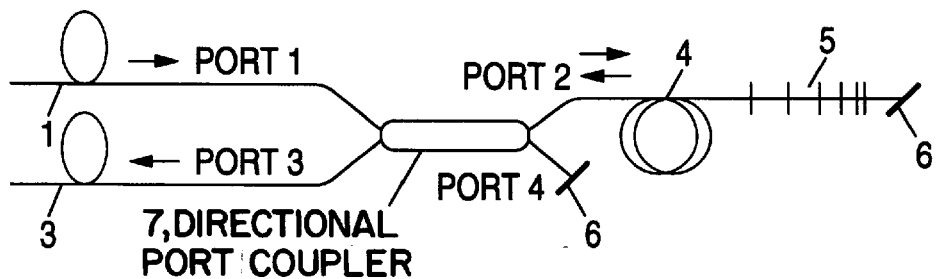
FIG. 1B is an explanatory view for explaining the first embodiment of the present invention showing a case where a directional coupler is used.

FIG. 1A is an explanatory view for explaining a first embodiment of the present invention showing a case where an optical circulator is used, and FIG. 1B is an explanatory view for explaining a first embodiment of the present invention showing a case where a directional coupler is used. In the drawing, the reference numeral 1 represents an input transmission path; 2, an optical circulator; 3, an output transmission path; 4, a dispersion compensating fiber; 5, a chirped grating; 6, a nonreflective terminal; and 7, a directional coupler.

In FIG. 1A, the input transmission path 1 is connected to a first port of the optical circulator 2, and a third port of the optical circulator 2 is connected to the output transmission path 3. Further, a second port of the optical circulator 2 is connected to the dispersion compensating fiber 4. The chirped grating 5 is connected to an end of the dispersion compensating fiber 4. The chirped grating 5 is preferably terminated at the nonreflective terminal 6. For example, the transmission path is constituted by a 1.3 µm single mode optical fiber. The chirped grating 5 reflects an optical signal so that chromatic dispersion in the transmission path which cannot be compensated by the round trip's chromatic dispersion characteristic of the dispersion compensating fiber 4 is compensated by a relatively wide wavelength range.

In FIG. 1B, the directional coupler 7 such as, for example, an optical fiber coupler is used instead of the optical circulator 2 which is a non-reciprocal element shown in FIG. 1A. In FIG. 1B, ports in the left of the directional coupler 7 are referred to as a first port and a third port, and ports in the right of the directional coupler 7 are referred to as a second port and a fourth port. The input transmission path 1 is connected to the first port. The third port is connected to the output transmission path 3. The second port is connected to the dispersion compensating fiber 4. The fourth port is preferably terminated at the nonreflective terminal 6. Although an insertion loss not lower than 3 dB arises when the directional coupler 7 is used, the loss can be compensated by an amplifier.

Figure 2:
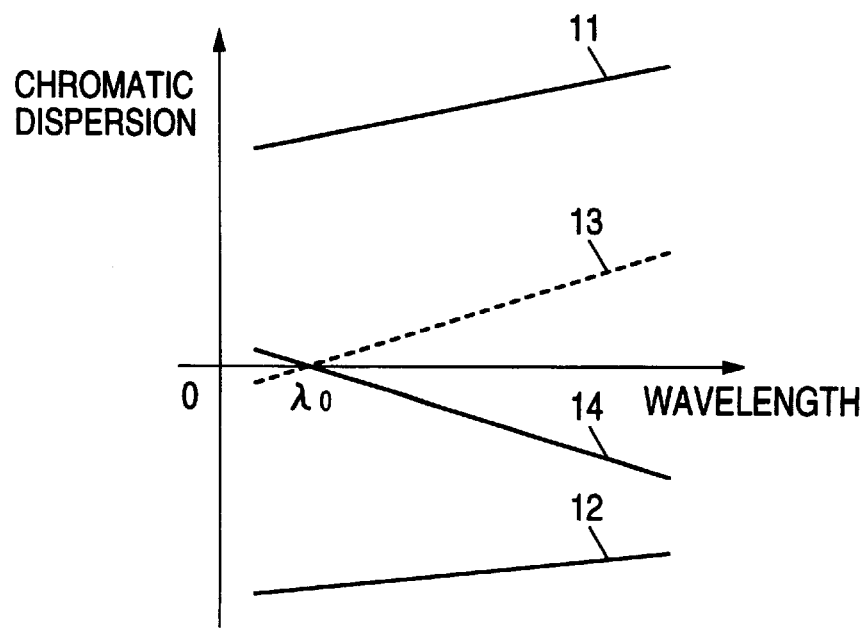
FIG. 2 is a graph for explaining the chromatic dispersion characteristic of the first embodiment.

FIG. 2 is a graph for explaining the chromatic dispersion characteristic of the first embodiment. The horizontal axis represents wavelength of an optical signal, and the vertical axis represents chromatic dispersion. The reference numeral 11 represents chromatic dispersion characteristic of the transmission path; 12, round trip's chromatic dispersion characteristic of the dispersion compensating fiber; 13, characteristic obtained by adding the round trip's chromatic dispersion of the dispersion compensating fiber to the chromatic dispersion of the transmission path; and 14, chromatic dispersion characteristic of the chirped grating which has a negative dispersion slope characteristic. The dispersion compensating fiber 4 has negative chromatic dispersion so that the round trip's chromatic dispersion characteristic 12 thereof exhibits chromatic dispersion which is equal in absolute value to but has opposite sign to the chromatic dispersion exhibited by the chromatic dispersion characteristic 11 of the transmission path at a predetermined wavelength $\lambda_0$. As a result, at the predetermined wavelength $\lambda_0$, the chromatic dispersion of the transmission path is compensated so that the value of chromatic dispersion becomes zero. When the chromatic dispersion characteristic 11 of the transmission path is almost compensated as described above, only a wavelength-dependent component of chromatic dispersion remains as a component which cannot be compensated. This residual characteristic is the characteristic 13 obtained by adding the round trip's chromatic dispersion of the dispersion compensating fiber to the chromatic dispersion of the transmission path.

Therefore, only the wavelength-dependent component of the chromatic dispersion is compensated by the chirped grating having the negative dispersion slope equal in absolute value to, but with negative sign to, the dispersion slope of the wavelength-dependent component. Consequently, chromatic dispersion after compensation can be set to be in a constant value 0 regardless of the wavelength. That is, the chromatic dispersion characteristic 14 of the chirped grating 5 is provided as a characteristic which exhibits a value equal in absolute value to, but with negative sign to the aforementioned residual characteristic, that is, the characteristic 13 obtained by adding the round trip's chromatic dispersion of the dispersion compensating fiber to the chromatic dispersion of the transmission path.

With reference back again to FIG. 1A, description will be made. An optical signal, for example, having a 1.55 µm band is injected into the optical circulator 2 at the first port thereof through the input transmission path 1 of a 1.3 µm single mode optical fiber, made to go out from the optical circulator 2 at the second port thereof, led to the dispersion compensating fiber 4 and reflected by the chirped grating 5. The reflected optical signal is propagated in the dispersion compensating fiber again, injected into the optical circulator 2 at the second port thereof and made to go out from the optical circulator 2 at the third port thereof toward the output transmission path 3.

Incidentally, the dispersion compensating fiber 4 may be connected to the first port or the third port of the optical circulator 2. Alternatively, two or three dispersion compensating fibers 4 may be used so as to be connected to different ports among the first, second and third ports. When the dispersion compensating fiber 4 is connected to the second port as described above, there arises an advantage in that the required length of the dispersion compensating fiber necessary for obtaining a predetermined delay time can be reduced by half.

Figure 3:
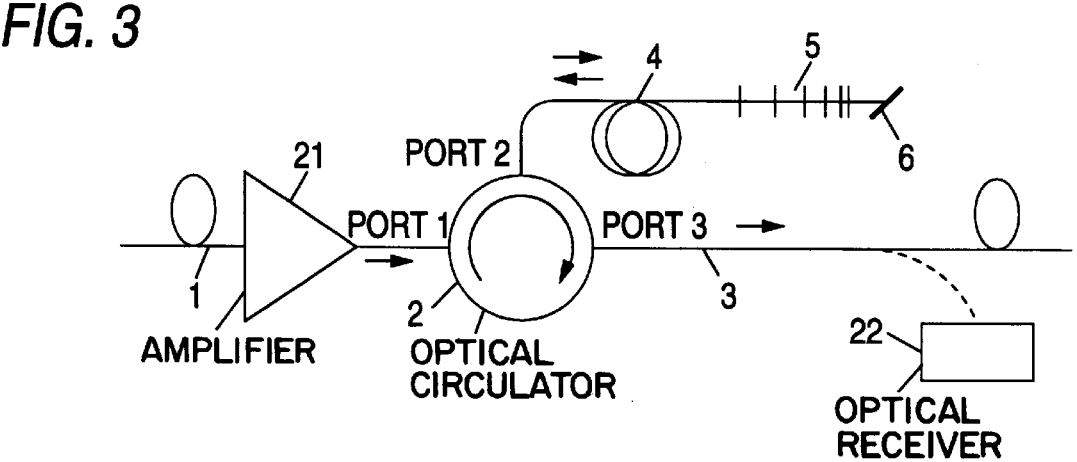
FIG. 3 is an explanatory view for explaining a first modified example of the first embodiment of the present invention.

FIG. 3 is an explanatory view for explaining a first modified example of the first embodiment of the present invention. In FIG. 3, elements the same as those in FIG. 1 are referenced correspondingly, and the description of those elements will be omitted. The reference numeral 21 and 22 represent an amplifier and an optical receiver, respectively. In this modified embodiment, the amplifier 21 such as an optical fiber amplifier, or the like, is inserted into the first port of the optical circulator 2 to thereby compensate the loss of insertion of the dispersion compensating fiber 4 and the chirped grating 5. The transmission path 3 or the optical receiver 22 is connected to the third port of the optical circulator 2.

Figure 4:
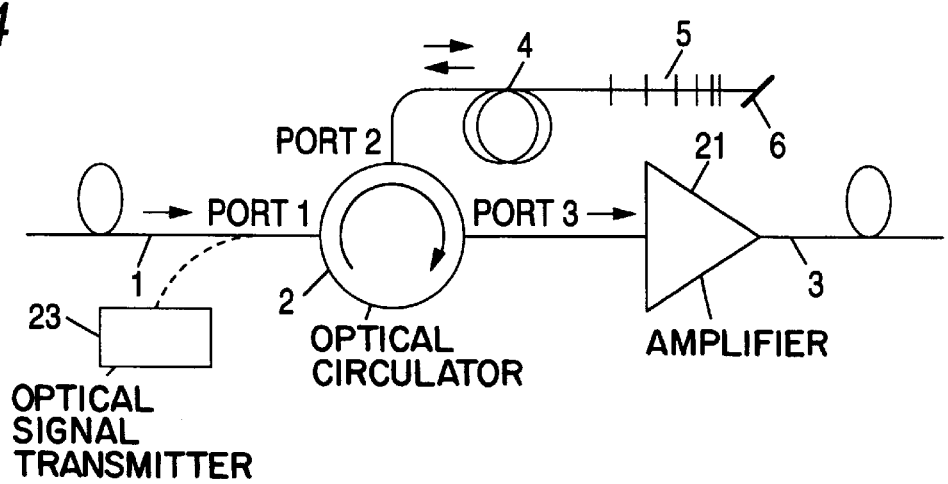
FIG. 4 is an explanatory view for explaining a second modified example of the first embodiment of the present invention.

FIG. 4 is an explanatory view for explaining a second modified example of the first embodiment of the present invention. In FIG. 4, elements the same as those in FIGS. 1 and 3 are referenced correspondingly, and the description of those elements will be omitted. The reference numeral 23 designates an optical signal receiver. In this modified embodiment, the optical fiber amplifier 21 is inserted into the third port of the optical circulator 2 to thereby compensate the insertion loss of the dispersion compensating fiber 4 and the chirped grating 5. The transmission path 3 or the optical signal transmitter 23 is connected to the first port of the optical circulator 2.

In the aforementioned first and second modified examples, the directional coupler 7 shown in FIG. 1B may be used instead of the optical circulator 2 shown in FIG. 1A. An amplifier function for compensating the loss of insertion of the directional coupler 7 may be given to the amplifier 21.

Figure 11:
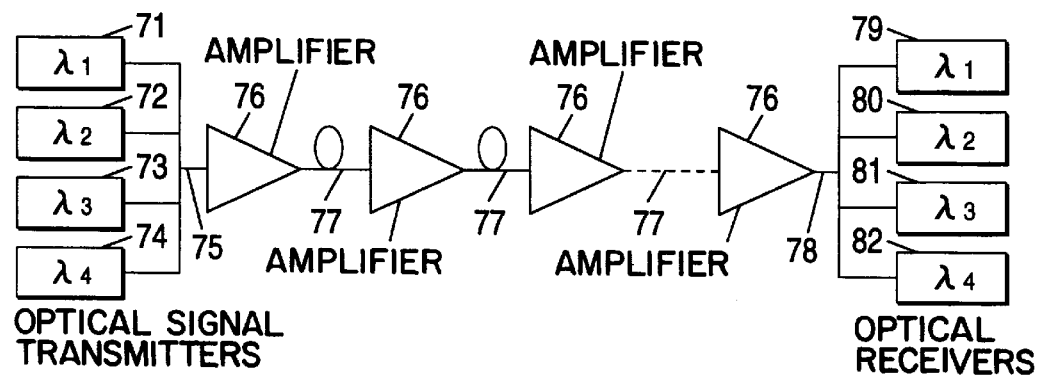
FIG. 11 is an explanatory view for explaining the wavelength multi relay transmission method.

The chromatic dispersion compensator described above with reference to FIGS. 1A through 4 can be set in an arbitrary portion on transmission paths 75, 77 and 78 in an amplified WDM transmission system shown in FIG. 11. Typically, the chromatic dispersion compensator is provided in the front, inside, or rear of an amplifier 76 so as to be adjacent thereto, so that chromatic dispersion of a transmission path 77 is compensated. The function of the amplifier 21 and/or the function of an amplifier for compensating the loss of insertion of the directional coupler 7 may be given to the amplifier 76.

Referring to FIGS. 11 and 1A, a specific example of the present invention will be explained. First, the case where the transmission path 77 in the four wavelength multiplexed amplified transmission system shown in FIG. 11 is constituted by a 1.3 $\mu$m single mode fiber will be described. It is assumed that the span of the transmission path 77 is 80 km, and the wavelength of the amplification band of the optical fiber amplifier 46 is 1550±10 nm, that is, the band width is 20 nm. In the case of wavelength $\lambda_0$=1540 nm, the chromatic dispersion of the 1.3 $\mu$m single mode fiber is about 16.5 ps/nm/km and the dispersion slope thereof is about 0.05 ps/nm$^2$/km. Further, in the case of the wavelength 1540 nm, the chromatic dispersion of the dispersion compensating fiber 4 is about −80 ps/nm/km and the dispersion slope thereof is about 0.10 ps/nm$^2$/km. In order to set the chromatic dispersion to zero in the case of the wavelength $\lambda_0$=1540 nm, the required length of the dispersion compensating fiber 4 is made to be (16.5×80/80=)16.5 km. If the optical signal is used so as to make a round trip, the required length of the dispersion compensating fiber 4 is made to be a half of the aforementioned value. In this case, the dispersion slope of the overall transmission path inclusive of the transmission path 77 of the 1.3 $\mu$m single mode fiber and the compensation due to the dispersion compensating fiber 4 is made to be (0.05×80+0.10×16.5=)5.65 ps/nm$^2$.

Accordingly, the delay time difference of $\{(½)\times5.65\times20^2=\}1130$ ps is required to be generated in the chirped grating 6. Accordingly, the required grating length becomes 11.3 cm. In the conventional method described above, the required grating length is 27.2 m in which the chirped grating 6 is only used. As a result, the required grating length can be reduced to ½₀ or less.

To put the required length of the dispersion compensating fiber 4 in a practical range, it is preferable that the chromatic dispersion of the dispersion compensating fiber 4 is set to be not larger than −40 ps/nm/km. When the chromatic dispersion of the dispersion compensating fiber 4 is −40 ps/nm/km, the required length of the dispersion compensating fiber 4 becomes (16.5×80/40=)33 km. In the case where the optical signal is used so as to make a round trip, however, the required length of the dispersion compensating fiber 4 is reduced to a half of this value, that is, the required length of the dispersion compensating fiber 4 becomes equal to the length of the aforementioned dispersion compensating fiber 4.

Next, the case where the transmission path 77 is constituted by a dispersion shifted fiber will be described. It is assumed that the transmission path 77 is constituted by a dispersion shifted fiber of 80 km. In order to avoid the four wave mixing generated in the dispersion shifted fiber, the zero dispersion wavelength is set, for example, to 1570 nm. The dispersion slope is about 0.08 ps/nm$^2$/km. The wavelength of the amplification band of the optical fiber amplifier is set to 1550±10 nm, that is, the band width is set to 20 nm.

First, the case where no dispersion compensating fiber 4 is used will be described as a comparative example. In the case of the wavelength 1550 nm, the chromatic dispersion of the dispersion shifted fiber is $\{0.08\times(-20)\times80=\}-128$ ps/nm. Accordingly, the required delay time difference in the chirped grating 6 becomes $\{128\times20=\}2560$ ps. As a result, the required grating length necessary for setting the chromatic dispersion to zero is 25.6 cm.

Next, the case where a 1.3 $\mu$m single mode fiber is used as the dispersion compensating fiber 4 will be described. A pure silica core fiber of very low loss is preferably used as the 1.3 $\mu$m single mode fiber. The chromatic dispersion of the dispersion shifted fiber at the wavelength of $\lambda_0$=1560 nm is $\{0.08\times(-10)=\}-0.8$ ps/nm/km because the dispersion slope is about 0.08 ps/nm$^2$/km, whereas the chromatic dispersion of the 1.3 $\mu$m single mode fiber at the wavelength of $\lambda_0$=1560 nm is 17.5 ps/nm/km and the dispersion slope is about 0.05 ps/nm$^2$/km.

In order to set the chromatic dispersion to zero at the wavelength of $\lambda_0$=1560 nm, the required length of the dispersion compensating fiber 4 is made to be $\{0.8\times80/17.5=\}3.66$ km. However, in the case where the optical signal is used so as to make a round trip, the required length is reduced to a half of this value. In this case, the dispersion slope of the overall transmission path inclusive of the transmission path 77 of the dispersion shifted fiber and the compensation due to the dispersion compensating fiber 4 is made to be $\{0.08\times80+0.05\times3.66=\}6.58$ ps/nm$^2$.

Accordingly, the delay time difference of $\{(½)\times6.58\times20^2=\}1316$ ps is required to be generated in the chirped grating 6. As a result, the required grating length becomes 13.2 cm which is about a half of 25.6 cm in the case where no dispersion compensating fiber 4 is used as described above. That is, the required grating length becomes a value adapted for practical use.

The required grating length in the case where the transmission path 77 is constituted by a 1.3 $\mu$m single mode fiber is substantially equal to the required grating length in the case where the transmission path 77 is constituted by a dispersion shifted fiber.

In the above described one example of the first embodiment, the second port of the optical circulator is connected to the chirped grating 5 via the dispersion compensating fiber 4 so as to reciprocate the signal light in the dispersion compensating fiber 4, thereby reducing the necessary length of the dispersion compensating fiber 4. The above structure is not always necessary to reciprocate the signal light in the dispersion compensating fiber 4. As described in OPTICAL FIBER TECHNOLOGY 1, (1995), p.p. 162–166 which is explained as the conventional art, the reflection type structure in which the dispersion compensating fiber is connected to the Faraday rotator mirror can be applied.

Figure 5:
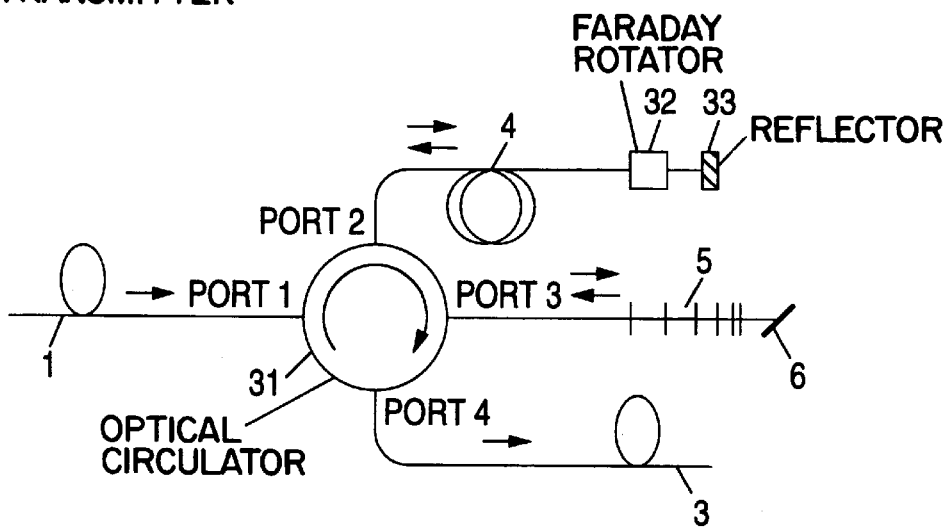
FIG. 5 is an explanatory view for explaining a second embodiment of the present invention.

FIG. 5 is an explanatory view for explaining a second embodiment of the present invention. In the drawing, elements the same as those in FIG. 1 are referenced correspondingly, and the description of those elements will be omitted. Reference numeral 31 represents an optical circulator; 32, Faraday rotator; and 33, a reflector. One variation of this embodiment is that the dispersion compensating fiber 4 is connected to the reflector 33 via the Faraday rotator 32, and the other one is that the chirped grating 5 is connected to the intermediate port of individual optical circulator 31. The Faraday rotator 32 changes the polarization direction of the reciprocating signal light.

The input transmission path 1 is connected to the first port which is an input port of the optical circulator 31. The output transmission path 3 is connected to a fourth port which is an output port thereof. The Faraday rotator 32 and the reflector 33 is sequentially connected so that the reflector 33 is connected to a second port which is one of the intermediate ports of the four-terminal optical circulator 31. The chirped grating 5 is connected to a third port which is the other of the intermediate ports.

The signal light from the input transmission path 1 is inputted to the first port of the optical circulator 31, is outputted from the second port, passes through the Faraday rotator 32 and the dispersion compensating fiber 4, and is inputted to the second port, sequentially. The signal light inputted to the second port is outputted from the third port, reciprocates the chirped grating 5, is inputted to the third port, and is outputted from the fourth port to the output transmission path 3.

The chirped grating 5 and the dispersion compensating fiber 4 give an opposite chromatic dispersion characteristic of the transmission path to the signal light, and reduce the necessary length of the dispersion compensating fiber 4 to half extent. At this time, the Faraday rotator 32 changes the polarization direction of the signal light reciprocating in the dispersion compensating fiber 4. For example, if the polarization direction is changed to the substantially vertical direction, it is possible to suppress the interference between the signal light and the Reyleigh dispersing light of the signal light reciprocating in the dispersion compensating fiber 4 to thereby suppress the induction of noise. Also, in the above described dispersion compensating fiber 4 having a large negative chromatic dispersion in 1.55 $\mu$m-band and the dispersion compensating fiber 4 using a 1.3 $\mu$m single mode fiber, the interference is generated to thereby induce noise.

The Faraday rotator has to be disposed adjacently to the reflector to suppress the interference. It may be considered that the polarization condition changes during the Faraday rotator 32 and the reflector 33. A known Faraday rotator with a mirror in which the functions of the Faraday rotator 32 and the reflector 33 are integrated is preferably used to obtain a large effect of suppression of the interference. Incidentally, it is desirable that the Faraday rotator vertically changes the polarization direction of the signal light reciprocating in the dispersion compensating fiber 4. However, it is acceptable that the Faraday rotator changes the polarization direction at an extent which the interference can be suppressed within an allowable range for practical use.

Similarly, the dispersion compensating fiber 4 which is connected to the reflector 33 via the Faraday rotator 32 is connected to the third port, and the chirped grating 5 is connected to the second port. Further, when an optical circulator having 5 or more ports is used, a plurality of chirped gratings are used in place of one chirped grating, and the chirped gratings are connected to respective intermediate ports.

In this case, the integration of respective chirped gratings can be replaced with one chirped grating. Accordingly, the length of respective chirped grating can be shorten one by one, and chirped gratings having different characteristics can be combined for use. Generally, the short chirped grating can be easily produced. Incidentally, this replacement can be also made in the first embodiment explained referring to FIG. 1 by using an optical circulator having four or more ports.

Similar to the first embodiment, the chromatic dispersion of the transmission path can be made by the dispersion compensating fiber 4 and the chirped grating 5. In the wavelength range used, the chromatic dispersion characteristic of the transmission path is desirably compensated as much as possible. However, it is possible to compensate the chromatic dispersion characteristic of the transmission path with them by connecting other dispersion compensating fibers to the first and fourth ports of the optical circulator 31. Two pairs of ones in which the dispersion compensating fiber 4 is connected to the reflector 33 via the Faraday rotator 32 may be used so that they are individually connected to the intermediate ports. Further, a plurality of chromatic dispersion compensator as shown in FIG. 1 or FIG. 2 is used so that the combination of the plurality of chromatic dispersion compensator compensate the chromatic dispersion of the transmission path.

In the above description, an example in which the optical circulator has four or more terminals is explained. However, a plurality of optical circulator having three terminals are connected in parallel to thereby obtain the optical circulator having four or more optical circulator. For example, the third port of a three-terminal optical circulator is connected to the first port of the other three-terminal optical circulator to thereby obtain the four-terminal optical circulator. Needless to say, one optical circulator can realize its function to thereby suppress the cost and reduce its arrangement space.

An amplifier such as an optical fiber amplifier has generally a single directivity. Accordingly, the amplifier can disposed at a place where the signal light is transmitted in one direction, for example, the amplifier can be connected to at least one of the first port which is the input port of the optical circulator 31 and the fourth port which is the output port thereof. Additionally, the directional coupler such as the optical fiber coupler can be used in place of the optical circulator 31.

Finally, an experimental result with respect to the function of the Faraday rotator 32 which changes the polarization direction of the signal light reciprocating in the dispersion compensating fiber 4 will be explained. As the dispersion compensating fiber 4, an optical fiber having large negative chromatic dispersion in 1.55 $\mu$m-band was used, and an optical signal transmission experimentation of 1.55 $\mu$m-band was carried out in a transmission path for a 1.3 $\mu$m single mode optical fiber.

Figure 6:
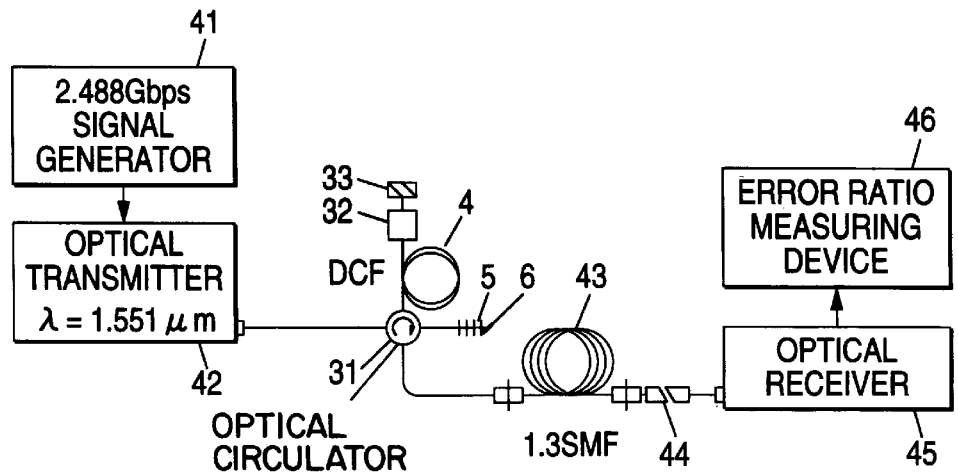
FIG. 6 is a structural view of a specific example of a second embodiment of the present invention.
Figure 7:
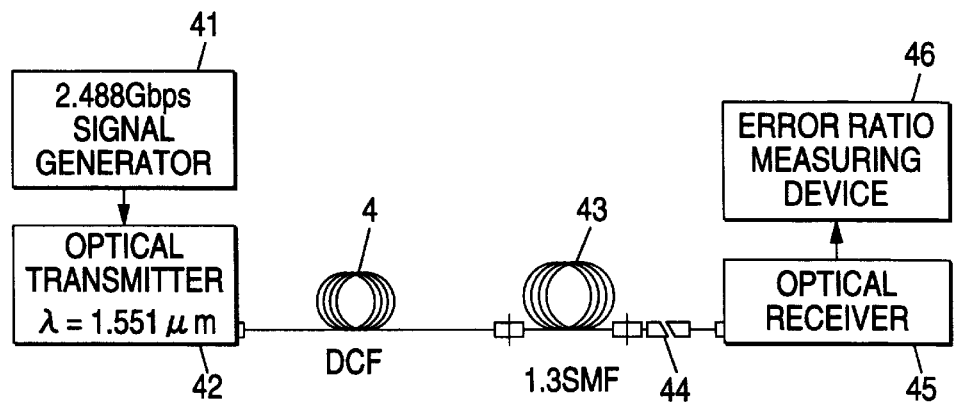
FIG. 7 is a structural view of a conventional one as a comparative example.
Figure 8:
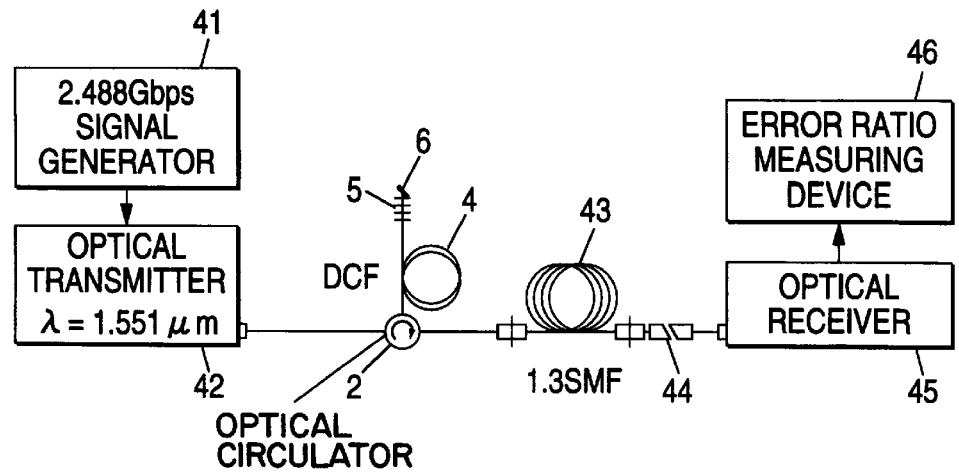
FIG. 8 is a structural view of an example of the first embodiment of the present invention as a comparative example.

FIG. 6 is a structural view of a specific example of a second embodiment according to the present invention. FIG. 7 is a conventional structural view as a comparative example. FIG. 8 is a structural view of a specific example of the first embodiment according to the present invention as a comparative example. In the drawings, elements the same as those in FIGS. 1 and 5 are referenced correspondingly, and the description of those elements will be omitted. In the drawings, reference numeral 41 represents a signal generator; 42, an optical transmitter; 43, a 1.3 $\mu$m-band single mode optical fiber (1.3 SMF); 44, a variable optical attenuator; 45, a optical receiver; and 46, an error ratio measuring device. The signal generator 41 generates a 2.488 Gbps signal, and the optical receiver output a signal light having a wavelength of $\lambda$=1.551 $\mu$m by receiving the output of the signal generator 41. The chromatic dispersion of the 1.3 $\mu$m single mode optical fiber at the wavelength of 1.55 $\mu$m is 16.5 ps/nm/km and its length is 67 km. The chromatic dispersion of the dispersion compensating fiber (DCF) at the wavelength of 1.55 $\mu$m is $-102.4$ ps/nm/km, and its length is 5.5 km in FIGS. 6 and 8, but is 11 km in FIG. 7.

In FIG. 6, the optical transmitter 42 receives the signal from the signal generator 41 and transmits the signal light to the first port of the optical circulator 31 of the chromatic dispersion compensator. The signal light from the fourth port of the optical circulator 31 passes through the 1.3 $\mu$m single mode optical fiber and the variable optical attenuator 44 to thereby be inputted into the optical receiver 45. The output of the optical receiver 45 is inputted into the error ratio measuring device 46 to measure the error ratio of the signal light. As the Faraday rotator 32 and the reflector 33, the Faraday rotator with mirror in which the rotation angle of the polarization plane of the signal light is 90° at the wavelength of 1.55 µm in the reciprocation is used. In practical use, the rotation angle is preferably in the range of 85° to 95°.

In FIG. 7, the optical transmitter 42 transmits the signal light to the 1.3 µm single mode fiber 43 via the dispersion compensating fiber 4. In FIG. 8, the optical transmitter 42 transmits the signal light to the first port of the optical circulator 2, and the signal light outputted from the third port of the optical circulator 2 is transmitted to the 1.3 µm single mode optical fiber 43.

Figure 9:
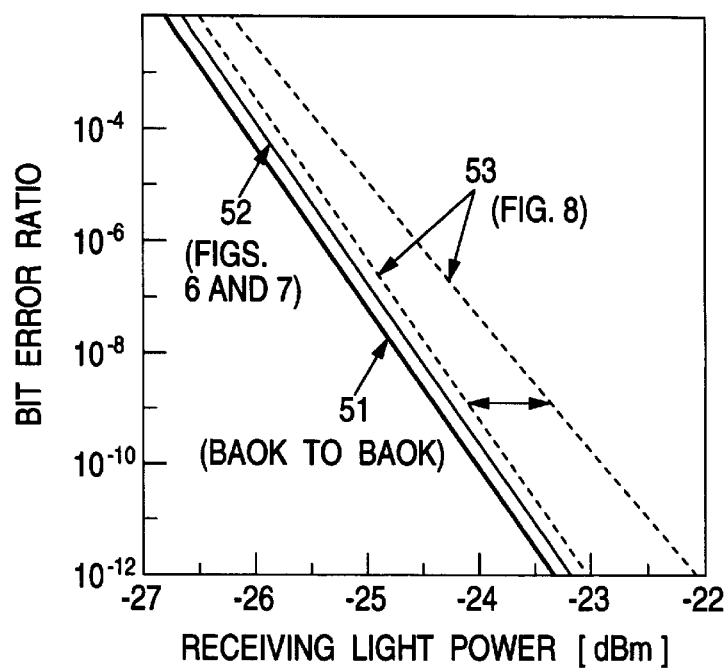
FIG. 9 is a graph showing a receving sensitivity of the specific examples as shown in FIGS. 6 to 8.
Figure 10:
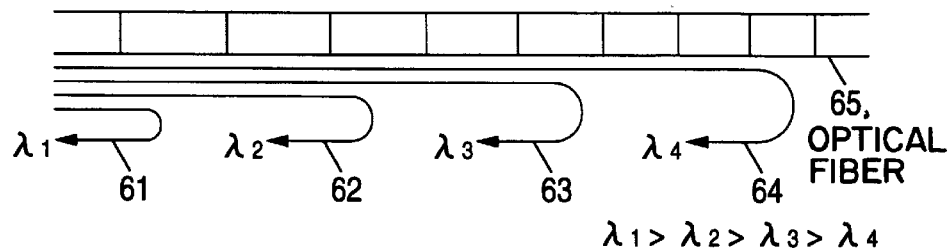
FIG. 10 is an explanatory view for explaining a chirped grating.

FIG. 9 is a graph showing a receiving sensitivity of the specific examples shown in FIGS. 6 to 9. In the graph, the horizontal axis represents a receiving power [dBm] and the vertical axis represents a bit error ratio. Reference numeral 51 represents an error ratio of the so-called BACK to BACK structure in which the optical transmitter 42 is directly connected to the optical receiver 45. Reference numeral 52 is an error ratio of the conventional structure shown in FIG. 7 and the specific example of the second embodiment according to the present invention shown in FIG. 6; and 53, an error ratio of the specific example of the first embodiment according to the present invention shown in FIG. 8.

The bit error ratio is reduced as the receiving power increases. The error ratio 51 of the BACK to BACK structure is the smallest one. The error ratio of the specific example of the first embodiment according to the present invention as shown in FIG. 8 tends to increase and has a dispersion. In the conventional structure as shown in FIG. 7 and the specific example of the second embodiment according to the present invention, the error ratio slightly increases but has no dispersion.

The dispersion of the receiving sensitivity does not depend on the chirped grating 5. This is because the same phenomenon occurs even when the chirped grating 5 is replaced with the whole reflection mirror as the reflector 33 in FIG. 8. The dispersion is decreased or increased, when a polarization controller disposed just before the optical circulator 2 is controlled so as to change the polarization condition of the light inputted into the optical circulator 2. It is considered that the dispersion of the receiving sensitivity is caused by the interference between one signal light and the Reyleigh dispersing light of the other signal light which reciprocate in the dispersion compensating fiber. This is because the receiving sensitivity when the dispersion compensating fiber 4 is removed so that the signal light outputted from the signal light is immediately reflected by the chirped grating is consistent with that of the above described conventional structure and become stable. Further, if the dispersion compensating fiber 4 is replaced with a dispersion shift fiber (DSF) in which the transmission loss and the dispersion are small, the width of the dispersion of the receiving sensitivity is made small.

In FIG. 8, although the receiving sensitivity was measured in a condition where the Faraday rotator 32 was inserted between the dispersion compensating fiber 4 and the chirped grating 5 and disposed about 30 cm before the chirped grating 5, the receiving sensitivity was dispersed. However, when the Faraday rotator 32 and the reflector 33 are separately provided, the receiving sensitivity disperses if the distance between them is about 30 cm. If there is such a problem that the error ratio is dispersed and become large, it is possible to solve the problem by increasing the output power of the signal light is increased, raising the correcting ability of an error correction symbol during transmission, or the like.

As is apparent from the above description, in accordance with the present invention, chromatic dispersion which cannot be compensated by the dispersion compensating fiber is compensated by the chirped grating so that not only the chromatic dispersion of the transmission path in an optical fiber communication system can be reduced but also the grating length of the chirped grating can be reduced greatly in a wide wavelength band of the optical fiber amplifier. As a result, waveform distortion caused by combination between chirping produced by direct modulation of a semiconductor laser used as a transmitter and chromatic dispersion becomes low. There arises an effect that lowering of transmission quality can be prevented. Particularly, the present invention is preferably used in a case where the chromatic dispersion of the respective signal lights in the WDM transmission using optical fibers are substantially simultaneously compensated.

What is claimed is:

1. A chromatic dispersion compensator comprising:

optical signal directing means having a first, second, third and fourth ports, for directing an optical signal inputted from one of said ports to another port of said ports;

reflection-type compensating means including a dispersion compensating fiber, a reflecting portion and changing means for changing a polarization direction of a reciprocating signal light, in which said dispersion compensating fiber is connected to said reflecting portion via said changing means;

an input transmission path which is connected to said first port;

an output transmission path which is connected to said fourth port so that the signal light is outputted from said fourth port; and at least one chirped grating;

wherein said reflection-type compensating means is connected to one of said second and third ports, and said chirped grating is connected to the other port.

2. A chromatic dispersion compensator according to claim 1, wherein said changing means is a Faraday rotator.

3. A chromatic dispersion compensator according to claim 1, wherein a rotation angle of a signal light polarization plane in a wavelength range used during reciprocation of said changing means is in the range of 85° to 95°.

4. A chromatic dispersion compensator according to claim 1, wherein said optical signal directing means is an optical circulator.

5. A chromatic dispersion compensator according to claim 1, wherein said optical signal directing means is a directional coupler.

6. A chromatic dispersion compensator according to claim 1, further comprising an optical fiber amplifier which is connected to at least one of said first and fourth ports of said optical signal directing means.

7. A chromatic dispersion compensating optical communication system comprising:

a transmission path comprising a 1.3 µm-band single mode fiber; and a chromatic dispersion compensator which is connected to an intermediate or end portion of said transmission path, said chromatic dispersion compensator comprising:

optical signal directing means having a first, second, third and fourth ports, for directing an optical signal inputted from one of said ports to another port of said ports;

reflection-type compensating means including a dispersion compensating fiber, a reflecting portion and changing means for changing a polarization direction of a reciprocating signal light, in which said dispersion compensating fiber is connected to said reflecting portion via said changing means;

an input transmission path which is connected to said first port;

an output transmission path which is connected to said fourth port so that the signal light is outputted from said fourth port; and at least one chirped grating;

wherein said reflection-type compensating means is connected to one of said second and third ports, and said chirped grating is connected to the other port;

wherein said dispersion compensating optical fiber has a negative chromatic dispersion in a wavelength range used.

8. A chromatic dispersion compensating optical communication system according to claim 7, wherein said dispersion compensating fiber has a chromatic dispersion equal to or less than −40 ps/nm/km in said wavelength range used.

9. A chromatic dispersion compensating optical communication system according to claim 7, wherein said wavelength range used in a range of 1540 to 1560 nm.

10. A chromatic dispersion compensating optical communication system comprising:

a transmission path comprising a fiber having a zero dispersion wavelength in 1.55 $\mu$m-band; and a chromatic dispersion compensator which is connected to an intermediate or end portion of said transmission path, said chromatic dispersion compensator comprising:

optical signal directing means having a first, second, third and fourth ports, for directing an optical signal inputted from one of said ports to another port of said ports;

reflection-type compensating means including a dispersion compensating fiber, a reflecting portion and changing means for changing a polarization direction of a reciprocating signal light, in which said dispersion compensating fiber is connected to said reflecting portion via said changing means;

an input transmission path which is connected to said first port;

an output transmission path which is connected to said fourth port so that the signal light is outputted from said fourth port; and at least one chirped grating;

wherein said reflection-type compensating means is connected to one of said second and third ports, and said chirped grating is connected to the other port;

wherein said dispersion compensating optical fiber has a positive chromatic dispersion in a wavelength range used.

11. A chromatic dispersion compensating optical communication system according to claim 10, wherein said dispersion compensating optical fiber is a 1.3 $\mu$m-band single mode fiber.

12. A chromatic dispersion compensating optical communication system according to claim 10, wherein said wavelength range used in a range of 1540 to 1560 nm.

13. A chromatic dispersion compensator comprising:

optical signal directing means having a plurality of ports, for directing an optical signal inputted from one of said ports to another port of said ports;

reflection-type compensating means including a dispersion compensating fiber, a reflecting portion and changing means for changing a polarization direction of a reciprocating signal light, in which said dispersion compensating fiber is connected to said reflecting portion via said changing means; and at least one chirped grating;

wherein said reflection-type compensating means is connected to one of said ports, and said chirped grating is connected to at least one of the other ports.

14. A chromatic dispersion compensator according to claim 13, wherein said changing means is a Faraday rotator.

15. A chromatic dispersion compensator according to claim 13, wherein a rotation angle of a signal light polarization plane in a wavelength range used during reciprocation of said changing means is in the range of 85° to 95°.

16. A chromatic dispersion compensator according to claim 13, wherein said optical signal directing means is an optical circulator.

17. A chromatic dispersion compensator according to claim 13, wherein said optical signal directing means is a directional coupler.

18. A chromatic dispersion compensator according to claim 13, further comprising an optical fiber amplifier which is connected to at least one of said first and fourth ports of said optical signal directing means.

19. A chromatic dispersion compensating optical communication system comprising:

a transmission path comprising a 1.3 $\mu$m-band single mode fiber; and a chromatic dispersion compensator which is connected to an intermediate or end portion of said transmission path, said chromatic dispersion compensator comprising:

optical signal directing means having a plurality of ports, for directing an optical signal inputted from one of said ports to another port of said ports;

reflection-type compensating means including a dispersion compensating fiber, a reflecting portion and changing means for changing a polarization direction of a reciprocating signal light, in which said dispersion compensating fiber is connected to said reflecting portion via said changing means; and at least one chirped grating;

wherein said reflection-type compensating means is connected to one of said ports, and said chirped grating is connected to at least one of the other ports; and wherein said dispersion compensating optical fiber has a negative chromatic dispersion in a wavelength range used.

20. A chromatic dispersion compensating optical communication system according to claim 19, wherein said dispersion compensating fiber has a chromatic dispersion equal to or less than −40 ps/nm/km in said wavelength range used.

21. A chromatic dispersion compensating optical communication system according to claim 19, wherein said wavelength range used in a range of 1540 to 1560 nm.

22. A chromatic dispersion compensating optical communication system comprising:

a transmission path comprising a fiber having a zero dispersion wavelength in 1.55 $\mu$m-band; and a chromatic dispersion compensator which is connected to an intermediate or end portion of said transmission path, said chromatic dispersion compensator comprising:

optical signal directing means having a plurality of ports, for directing an optical signal inputted from one of said ports to another port of said ports;

reflection-type compensating means including a dispersion compensating fiber, a reflecting portion and changing means for changing a polarization direction of a reciprocating signal light, in which said dispersion compensating fiber is connected to said reflecting portion via said changing means; and at least one chirped grating;

wherein said reflection-type compensating means is connected to one of said ports, and said chirped grating is connected to at least one of the other ports; and wherein said dispersion compensating optical fiber has a positive chromatic dispersion in a wavelength range used.

23. A chromatic dispersion compensating optical communication system according to claim 22, wherein said dispersion compensating optical fiber is a 1.3 $\mu$m-band single mode fiber.

24. A chromatic dispersion compensating optical communication system according to claim 22, wherein said wavelength range used in a range of 1540 to 1560 nm.

* * * * *